(12) United States Patent
Chu et al.

(10) Patent No.: US 7,190,740 B2
(45) Date of Patent: Mar. 13, 2007

(54) ARRANGEMENT FOR DYNAMIC DC OFFSET COMPENSATION

(75) Inventors: Lichung Chu, San Diego, CA (US); Thomas Klingenbrunn, San Diego, CA (US); Benny Vejlgaard, Gistrup (DK); Antoine J. Rouphael, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 663 days.

(21) Appl. No.: 10/224,047

(22) Filed: Aug. 19, 2002

(65) Prior Publication Data

US 2004/0032914 A1 Feb. 19, 2004

(51) Int. Cl.
*H04L 25/06* (2006.01)

(52) U.S. Cl. ............... 375/319; 375/350; 327/307

(58) Field of Classification Search ........ 375/229, 375/233, 260, 316, 317, 319, 340, 341, 342, 375/346, 348, 350; 327/306, 307, 311
See application file for complete search history.

(56) References Cited

U.S. PATENT DOCUMENTS

| | | | | |
|---|---|---|---|---|
| 5,487,186 A | * | 1/1996 | Scarpa | 455/192.2 |
| 5,749,051 A | | 5/1998 | Dent | |
| 5,970,105 A | * | 10/1999 | Dacus | 375/344 |
| 6,100,827 A | | 8/2000 | Boesch et al. | |
| 6,225,848 B1 | * | 5/2001 | Tilley et al. | 327/307 |
| 6,370,205 B1 | | 4/2002 | Lindoff et al. | |
| 6,459,889 B1 | * | 10/2002 | Ruelke | 455/296 |
| 6,725,024 B1 | * | 4/2004 | Lindoff et al. | 455/255 |
| 6,901,121 B1 | * | 5/2005 | Dubrovin et al. | 375/346 |

FOREIGN PATENT DOCUMENTS

| | | |
|---|---|---|
| DE | 195 31 998 A1 | 3/1997 |
| EP | 0 474 615 B1 | 3/1998 |
| WO | WO 00/11831 | 3/2000 |
| WO | WO 01/03396 A2 | 1/2001 |

OTHER PUBLICATIONS

Raheli et al., Per Survivor Processing: A General Approach to MLSE in Uncertain Environments, Feb./Mar./Apr. 1995, IEEE, vol. 43, pp. # 354-364.*
Lindoff, Bengt; "Using a Direct Conversion Receiver in Edge Terminals—A New DC Offset Compensation Algorithm"; PIMRC Conference, Sep. 2000, pp. 959-963.
Digital cellular telecommunications system (Phase 2+); Radio transmission and reception (GSM 05.05 version 8.5.0 Release 1999); ETSI EN 300 910 V8.5.0 (Jul. 2000) European Standard (Telecommunications series); Global System for Mobile Communications.
R. Raheli, A. Polydoros, and C.-K Tzou, Per-Survivor Processing: A General Approach to MLSE in Uncertain Environments, *IEEE Trans. Comm*, vol. 43, No. /3/4, pp. 354-364, Feb./Mar./Apr. 1995.

* cited by examiner

*Primary Examiner*—Pankaj Kumar
*Assistant Examiner*—Naheed Ejaz

(57) ABSTRACT

A DC tracking arrangement includes a first tracking unit for slow tracking receiving an input signal and generating a first output signal, a second tracking unit for fast tracking receiving the input signal and generating a second output signal, and a decision unit receiving the first and second output signal for selecting the first or second output signal.

24 Claims, 5 Drawing Sheets

ARRANGEMENT FOR DYNAMIC DC OFFSET COMPENSATION

BACKGROUND OF THE INVENTION

The present invention relates generally to digital signal detector arrangements and in particular to a dynamic DC offset compensation arrangement as well as a Viterbi equalizer with integrated dynamic DC offset compensation in wireless systems.

Wireless technology provides a plurality of applications for voice and/or data transmission. Today's cell phone networks offer a plurality of services for their customers including digital data services, such as digital email, Internet access, etc. In future applications, such as third generation wireless networks, a plurality of new digital data services will be provided. In particular, Internet applications will be highly improved and made more practical, for example, via high speed digital data transmission. Other digital data application, not yet applicable in today's wireless transmission technology, will be adapted and implemented.

High speed wireless data applications require high data throughput at a significantly lower bit error rate than voice applications. Bit errors in voice applications are usually easy to recover or do not need to be fully recovered due to redundancy capabilities of the human ear; whereas, digital data applications often highly rely on the correctness of the submitted data. The quality of data transmissions in a digital environment highly depends on the quality of the transmission channel. Under severe channel conditions, the mobile device throughput is markedly affected due to retransmission of erroneous data packets, thus affecting the entire network throughput. This situation may be ameliorated by the use of antenna diversity and more sophisticated signal processing algorithms.

According to the prior art, decision feedback equalizers are used to compensate for the effects of the transmission channel, which can vary depending on the environment. A basic decision feedback equalizer (DFE) consists of a forward filter, a feedback filter, and a decision device. Decision feedback equalizers are effective against severe intersymbol-interference. Intersymbol-interference is an effect which creates distortion of the transmitted signal in a specific way. In a sequence of positive and negative symbol pulses, intersymbol-interference is the distortion of a symbol pulse within a particular symbol period caused by the smearing or spillover of symbol pulses of preceding and/or succeeding adjacent symbol pulses into the particular symbol period. The spillover of the preceding and/or succeeding symbol pulses will add to or subtract from the symbol pulse in the particular symbol interval depending upon whether the adjacent interfering symbol pulses are positive or negative in value. In applications with mobile devices, intersymbol-interference occurs due to the multi-path profile of the mobile channel as well as the above mentioned smearing which is generated due to analog filtering. Unlike linear equalizers, decision feedback equalizer's decision errors propagate in the feedback branch thus affecting the outcome of future bit decisions.

In digital communication receivers, an important problem is that of estimating the channel impulse response in the presence of a DC offset. In communication systems using frequency hopping, this needs to be done without knowledge about previous bursts. If the DC offset is constant throughout the burst, several techniques exist to remove the offset and subsequently perform the channel impulse response estimation. One way is, for example, to simply average or least square circular fit the signal. Another option is the joint detection of DC and the channel impulse response, which seems to work particularly well for non-constant envelope signals.

Dynamic DC signals are often experienced in the receiver with a Direct Conversion Radio Frequency (DC-RF) receiver architecture. For example, an input signal to such a DC-RF receiver may be given as:

$$x(t) = A \cos \omega t \qquad (1)$$

The output of a square non-linearity is then given as:

$$y(t) = \alpha_2 x^2(t) = \frac{1}{2}\alpha_2 A^2 + \frac{1}{2}\alpha_2 A^2 \cos 2\omega t \qquad (2)$$

These non-linearities are usually found as imperfection in a DC-RF receiver, such as transistor mismatch in the signal path, oscillator signal leaking and self-down-converting to DC through the mixer, etc. FIG. 1 shows a scenario in which the desired baseband signal is located at DC plus an unmodulated interferer at the frequency ω. In this case, the power of the in-band interferer at DC is thus given as $$\frac{1}{2}\alpha_2 A^2.$$

If such a scenario takes place during a burst as shown in FIG. 2, conventional DC estimation will fail and the subsequent channel impulse response estimation will lead to a corrupted channel impulse response, causing equalization to fail. In FIG. 2, a typical burst data structure is shown as used, for example, in a GSM wireless environment. Such a burst consists typically of a left and a right data sequence comprising an intermediate test sequence TS. On top of the data burst structure a typical DC offset is schematically shown. In this example, the DC offset starts within the test data sequence and ends within the right data sequence. Other scenarios are possible.

Based on GSM 05.05, the interference level for an AM supression test is −31 dbm, and a typical AM supression of a RF chip is around 80 dB. This gives the peak energy of the DC offset at −31−80=−111 dbm, which is on the same level as the noise. Thus, it is very difficult to detect such a DC signal, because the DC offset itself is masked within the noise as both have similar power levels.

SUMMARY OF THE INVENTION

The present invention provides a compensation arrangement for a digital signal detector arrangement which considers DC offsets within a burst.

According to a first embodiment, the present invention provides a DC tracking arrangement comprising a first tracking unit for slow tracking receiving an input signal and generating a first output signal, a second tracking unit for fast tracking receiving the input signal and generating a second output signal, and a decision unit receiving the first and second output signal for selecting the first or second output signal.

A more complete understanding of the specific embodiments of the present invention and advantages thereof may be acquired by referring to the following description taken in conjunction with the accompanying drawings, in which like reference numbers indicate like features.

DETAILED DESCRIPTION OF THE SPECIFIC EMBODIMENTS

Figure 1:
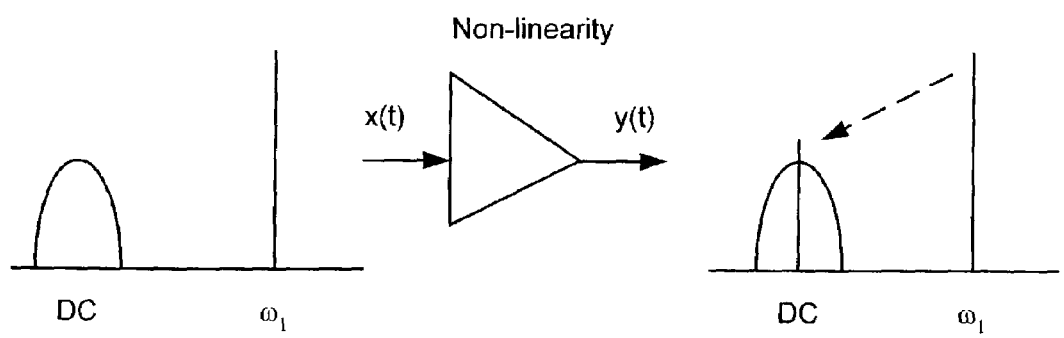
FIG. 1 shows an exemplary channel interferer and its impact on a baseband signal.

Another embodiment is a Viterbi equalizer comprising a plurality of states, wherein each state comprises a DC tracking arrangement comprising a first tracking unit for slow tracking receiving an input signal and generating a first output signal, a second tracking unit for fast tracking receiving the input signal and generating a second output signal, and a decision unit receiving the first and second output signal for selecting the first or second output signal.

The first tracking unit can be a narrow band filter and the second tracking unit can be a wide band filter. The decision unit can compare the absolute difference of the first and second filter output with a predefined threshold. Each filter may comprise a feedback input receiving a feedback signal from said decision unit. The threshold can be the root-mean-square of the input signal times a constant. Furthermore, an upper bounding unit for limiting the input signal can be implemented whereby the upper bounding unit may reset the input signal if the input signal is greater than a predetermined value. A rotation unit and a de-rotation unit for rotating the input/output signal may be provided wherein the rotation unit receives the input signal and is coupled with the first and second filter and the de-rotation unit is coupled to the output of the decision unit.

Each state of the Viterbi equalizer according to the present invention may receive a plurality of DC offset values and a input symbol. The equalizer may further comprise a plurality of subtractors for subtracting one of the plurality of DC offset values from the input symbol and generating an output signal, a plurality of metric calculation units each receiving a respective output signal from an associated subtractor for providing a metric output signal, and a compare unit receiving the plurality of metric output signals for generating an error signal which is used as the input signal for the DC tracking arrangement.

A method of determining and tracking a DC offset in a digital signal stream used for symbol detection according to the present invention includes the steps of providing a digital signal stream to an equalizer for symbol determination; determining an error value for each symbol; narrow band filtering the error value for slow tracking of the DC offset; wide band filtering the error value for fast tracking of the DC offset; comparing the output values of the narrow and wide band filtering; and selecting the narrow or wide band output values as a DC offset value.

The narrow band filtering can be a low pass filtering, and the wide band filtering can be a high pass filtering. The step of comparing may comprise the step of comparing the absolute difference of the output values of the narrow band and the wide band filtering with a predefined threshold. The threshold is based upon the root-mean-square value of the digital signal stream. Furthermore the step of upper-bounding the input signal can be provided, wherein the step of upper-bounding includes the step of comparing the input signal with a predetermined value and resetting the input signal if the input signal is greater than the predetermined value. The method may also comprise the step of rotating the input signal before determination of the DC offset and de-rotating the signal after determination of the DC offset.

The present invention can be implemented in a wireless product including a digital signal detector arrangement. The detector arrangement can be implemented within a digital signal processor.

Figure 3:
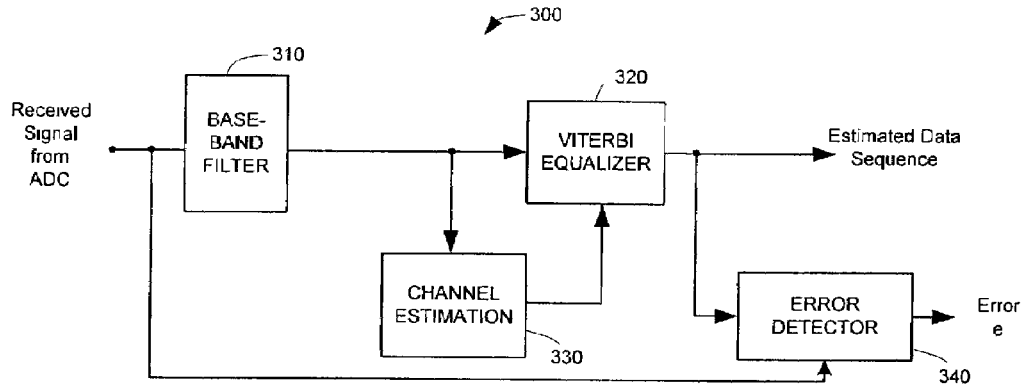
FIG. 3 shows a typical equalizer arrangement according to the prior art.

FIG. 3 shows a typical equalizer used within an arrangement 300 for signal detection. Such an arrangement 300 receives an input signal, for example, from an analog-to-digital converter. This input signal is fed to a baseband filter 310. The output of baseband filter 310 is coupled with a Viterbi equalizer 320 and a channel estimator unit 330 which controls the Viterbi equalizer 320. The output of the Viterbi equalizer delivers the estimated data sequence. Either within the Viterbi equalizer or externally to the Viterbi equalizer (as shown in FIG. 3), an error detection unit 340 is provided. This unit basically subtracts the estimated data sequence from the incoming data sequence to determine an error value e.

Figure 2:
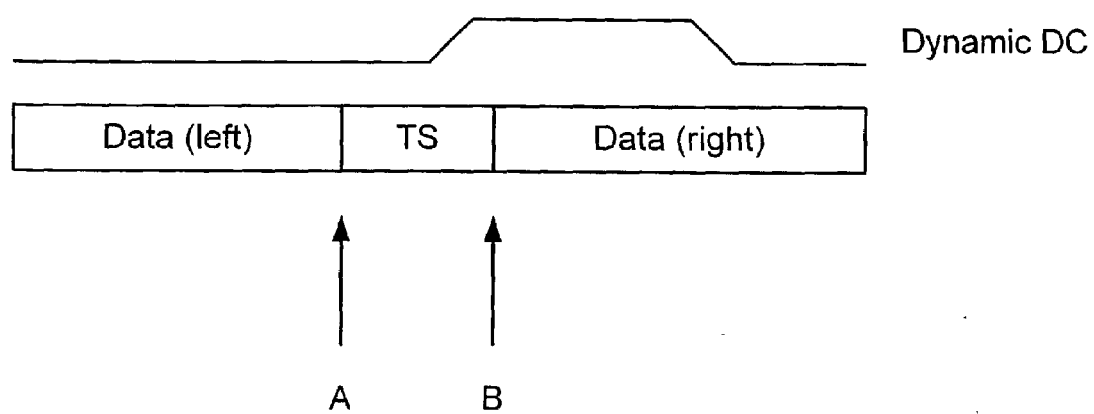
FIG. 2 shows the structure of a data burst and a possible DC offset signal.
Figure 4:
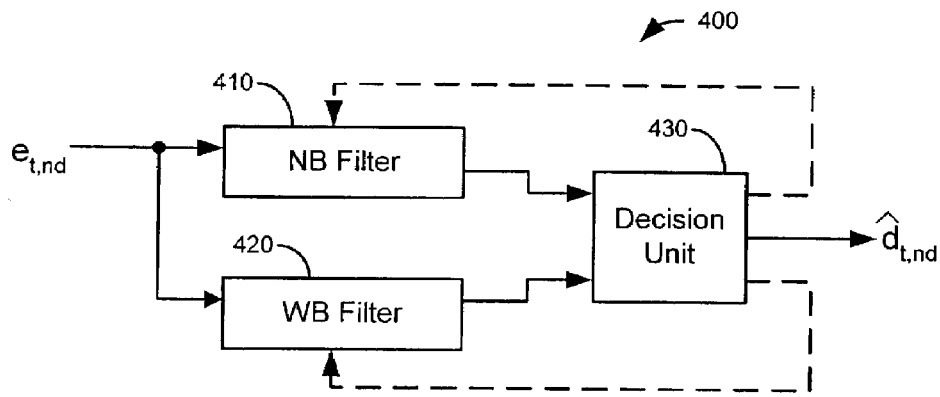
FIG. 4 shows a block diagram of a first exemplary embodiment according to the present invention.

FIG. 4 shows an exemplary embodiment of an arrangement to detect and track a DC signal. This unit receives an error signal $e_{t,n_d}$ as an input signal. This input signal is fed to a narrow band filter 410 and to a wide band filter 420. The output signals of the narrow band filter 410 and of the wide band filter 420 are fed to a decision unit 430 which generates a DC offset signal $d_{t,n_d}$. This arrangement only needs to compensate the offset in the data portion shown in FIG. 2. Thus, it is assumed that the initial DC estimate is known at the boundary points A and B as shown in FIG. 2, and that the channel estimate h is also known and typically does not vary through the data portion. The arrangement shown in FIG. 4 tracks the DC offset for compensation within, for example, a Viterbi equalizer. The architecture has a dual-filter block which can be easily integrated within a Viterbi equalizer.

In an Intersymbol Interference (ISI) channel, the channel response can be expressed by:

$$H(z) = \sum_{l=0}^{L-1} h_k z^{-l} \tag{3}$$

and the received signal with DC offset becomes $$r_t = \sum_{l=0}^{L-1} h_l x_{n-l} + d_t + n_t \tag{4}$$

The error metric calculated in the Viterbi equalizer is given by $$e_t = r_t - \sum_{k=0}^{K-1} h_l x_{n-k} = d_t + n_t \quad (5)$$

For zero-mean noise, $n_t$, a feasible DC estimate would, thus, be the error value $e_t$. However, this estimate could be noisy and unreliable. For white or wide band (WB) noise, the error signal can be low pass filtered to obtain a good estimate of the relatively narrow band (NB) DC offset. Such a narrow filtering, however, inevitably lowers the capability of tracking a very fast varying DC offset, in particular, if the filter bandwidth becomes too narrow. To accommodate both criteria, the DC tracker arrangement according to the present invention, as shown in FIG. 4, provides a second filter 420 having a wide band characteristic. This filter 420 receives the same error signal $e_t$ as an input signal. A DC tracker arrangement also comprises a decision unit 430 which receives the output signals of both filters 410 and 420. The narrow band filter 410 provides better noise rejection while the wide band filter 420 has a better tracking capability. The decision unit 430 then selects dynamically the filter which provides the more reliable output signal. Furthermore, the decision unit 430 may also provide feedback to the filters 410, 420 as indicated by the dotted lines in FIG. 4. Such a feedback signal could, for example, dynamically configure or reset each filter.

Figure 5:
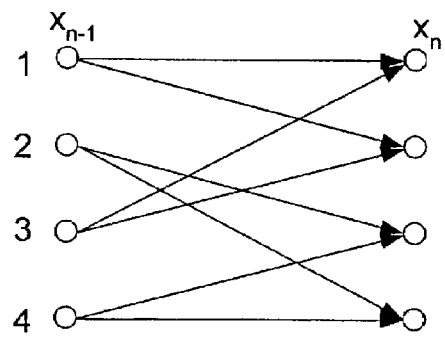
FIG. 5 shows a typical Viterbi equalizer.

Depending on how such a DC tracker is integrated within for example a Viterbi equalizer, the types of filters and their configurations, different rules for application by the decision unit, and different (if at all) feedback mechanisms can be implemented. FIG. 5 shows a typical trellis of a Viterbi equalizer. A Viterbi detector recreates a sequence of symbols by calculating the likelihood for all possible sequences. The sequence which gives the best fit between the real received sequence and the recreated sequence is then selected. A sequence is given as defined in equation (4) where $r_t$ is the known received signal, $h_1$, $1=0 \ldots L-1$ are the known channel coefficients, $x_{n-1}$, $1=0 \ldots L-1$ are the unknown transmitted symbols, $n_t$ is the unknown white Gaussian noise, and $d_t$ is the respective DC offset. FIG. 4 shows the functionality of a 4-state Viterbi detector. The current state represents the sequence of 2 symbols, namely $x_{n-1}$ and $X_n$. Therefore, four possible sequences are depicted by numerals 1–4. For the next state 8 sequences are possible which are reduced to 4 possible states by means of a minimum decision. The minimum decision selects the path with the lowest branch metric.

Figure 6:
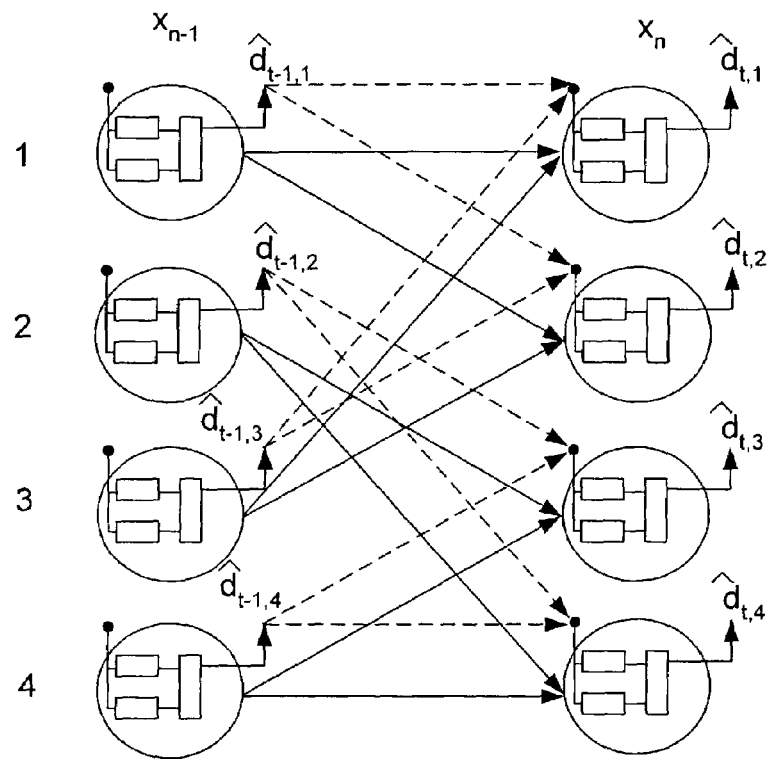
FIG. 6 shows a modified Viterbi equalizer according to another embodiment of the present invention.

FIG. 6 shows a modified Viterbi equalizer according to another embodiment of the present invention. Each stage 1–4 on each side of the trellis incorporates a DC tracker arrangement as, for example, shown in FIG. 4. For state n at time t−1, the DC estimate at the output of that particular DC tracker n is denoted by $\hat{d}_{t-1,n_j}$. Along each of the paths between two layers of the trellis, $\hat{d}_{t-1,n_j}$ is passed to the destination state and subtracted from the received signal $r_t$ for pre-correction. The error metric is then calculated based on the pre-corrected signal. After comparing all the accumulated error metrics, one for each incoming path, the process in the destination state $n_d$ selects the survival path corresponding to the smallest accumulated error metric. The error metric calculated from the survival path $$e_{t,n_d} = r_t - \sum_{k=0}^{K-1} h_l x_{n-k} \quad (6)$$

is then filtered by the DC tracker to provide a reliable estimate of the current DC offset $\hat{d}_{t,n_d}$. This method of selecting only the DC estimate associated with the survival state is a Per-Survivor Processing (PSP) in Detection/Estimation Theory.

Figure 7:
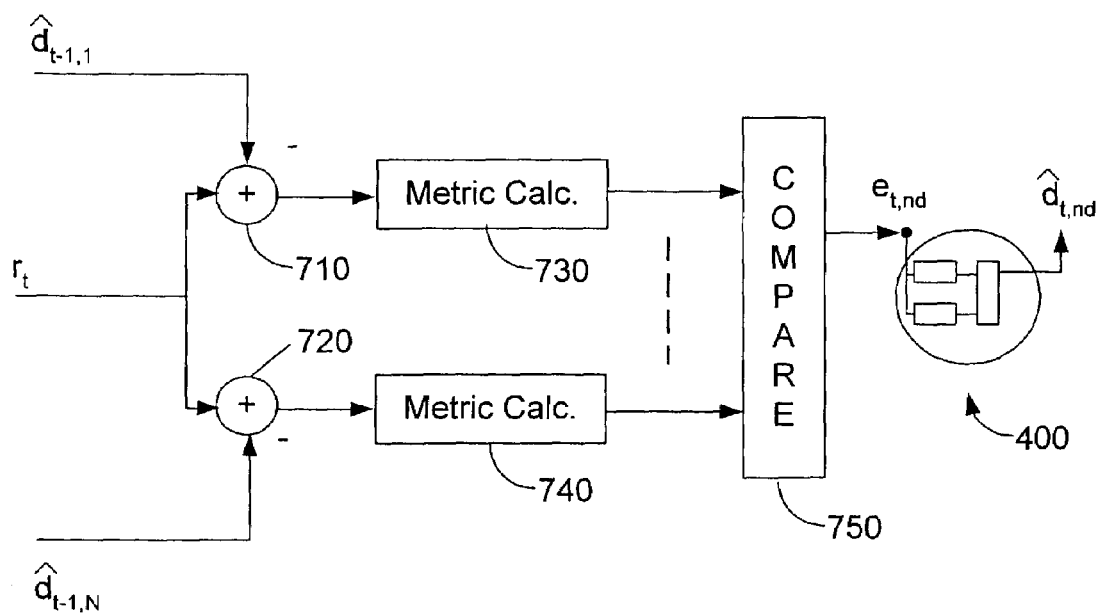
FIG. 7 shows a single state within a modified Viterbi equalizer in more detail.

FIG. 7 shows the integration of the DC tracker in within a trellis state in more detail. The incoming signal $r_t$ is fed to a plurality of adders 710, 720. The amount of adders is defined by the number of state transitions. In the simple example shown in FIGS. 6 and 7, two adders are needed. Adder 710 also receives the first incoming DC offset $\hat{d}_{t-1,N}$ and adder 720 receives the DC offset of $\hat{d}_{t-1,N+2}$. For example, states 1 and 2 receive DC offset signals from previous states 1 and 3, state 3 and 4 receive DC offset signals from previous states 2 and 4 as shown in FIG. 6. The output of adder 710 is coupled with a metric calculation unit 730 for determining the respective metric. In a similar way, the output of adder 720 is coupled with metric calculation unit 740. The determined metric values are then fed to a compare unit 750 which selects the surviving error value $e_{t,n_d}$. This error value $e_{t,n_d}$ is then fed to the DC tracker 400 for determining and tracking the DC offset for the following input signal.

After the modulation is removed by subtracting the tentative symbol from the received signal, as shown in equation 6, the input signal (error value $e_{t,n_d}$) is the DC offset plus noise. Thus, the desired function of the filters is to track the DC offset in a noisy environment. To compromise between multiple design criteria, the dual filters are designed as 2nd-order Butterworth filters which have a low complexity, low delay, and acceptable performance. However, other suitable filter designs can be used depending on the performance of the respective digital signal processor. The bandwidth of the dual-filter arrangement in the DC tracker is selected such that the narrow band filter has good noise rejection and the wide band filter has a fast response. In other words, the first filter is designed to generate optimal signal accuracy; whereas, the second filter is designed to generate optimal time response.

A suitable rule for the decision block 430 is

---

If abs (NB filter output − WB filter output) > rms*DualFactor
Then switch to fast tracking;
reset all taps in the NB filter with the current WB filter output;
(DC estimate by fast tracking)
Else
Use slow tracking,

---

However, other suitable rules can be implemented. In the above disclosed rule, if the absolute value of the difference between the narrow band filter output and the wide band filter output is greater than the root-mean-squared value of the received signal times a factor, then fast tracking will be established. Otherwise, slow tracking will be used. This decision is preferably made once per sample processed by both filters 410 and 420. Again, the rms is the root-mean-squared value of the received signal. For high signal to DC ratio, where the DC contributes minute value of the rms, it can be assumed that the rms will be constant in the burst.

Figure 8:
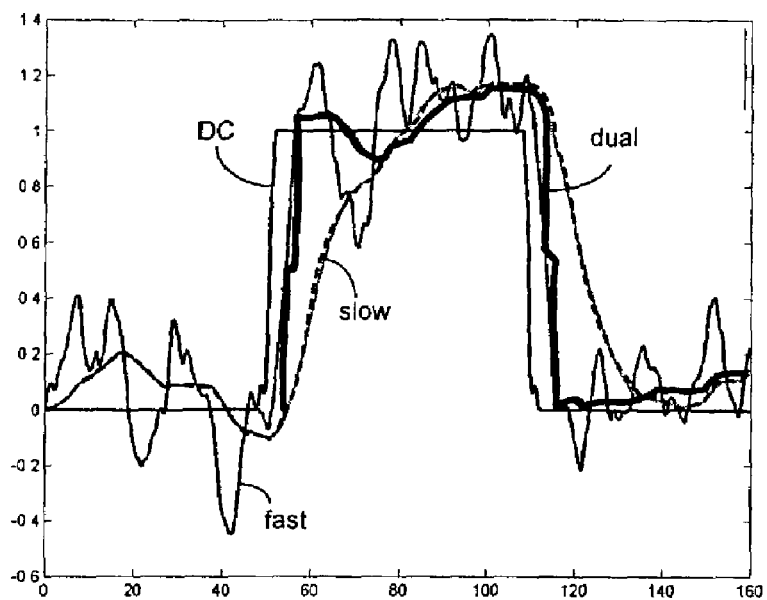
FIG. 8 shows a typical DC offset curve and respective tracking.

FIG. 8 shows tracking at various points within the DC tracker as shown in FIG. 4. The first thin solid line represents an exemplary DC offset. The output of the fast and the slow filters are shown as a second thin solid line and as a broken line. The output of the decision unit 430 is initially identical to the slow tracking and later shown as a thick solid line. The exemplary embodiments used in FIG. 8 provide the bandwidth of both filters equal to 0.01 and 0.04, respectively. The parameter of the DualFactor equals 0.5 and the square-root noise power is equal to 1. FIG. 8 shows that the dual DC tracker according to the present invention generates a much better output signal than any of the single filters. It should be noted that FIG. 8 demonstrates the results of a simplified version without the Viterbi equalizer (i.e., the DC tracker as shown in FIG. 4).

Figure 9:
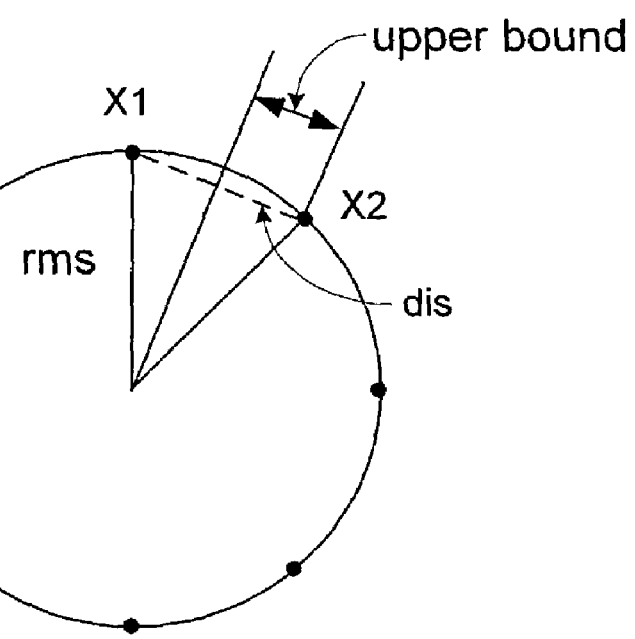
FIG. 9 shows the constellation of two symbols and their distance relationship.

A potential problem might occur by offsetting the metric in the trellis with the DC estimates at the dual-filter outputs, as shown in FIG. 7 and equation (6). The DC estimate associated with the incorrect paths in the trellis could be large and meaningless. To avoid offsetting the signal with these big values, an upper bound of the DC estimate can be established. A reasonable setting of such an upper bound (UpBoundFactor) could be, for example, half the distance between the closest symbols within the constellation. FIG. 9 shows an exemplary constellation for a PSK with 8 symbols which can be used within such a system. The distance of only two symbols X1 and X2 are shown in this constellation for purposes of defining the distance between these symbols.

The following rule can be used to define the upper boundary:

$$\text{if } |e| > \text{UpBoundFactor} * 0.5 \sqrt{2 - \frac{2}{\sqrt{2}}}$$

Figure 10:
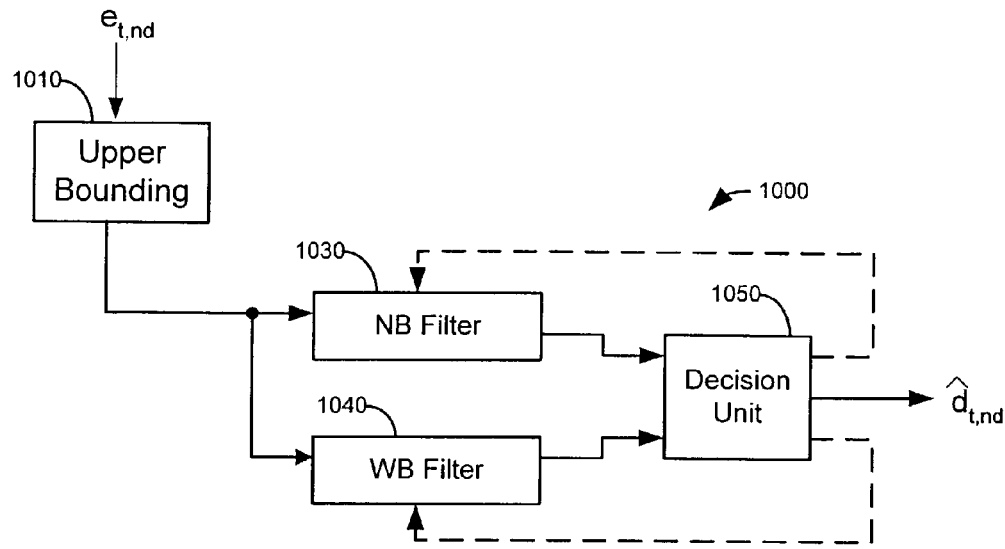
FIG. 10 shows a block diagram of another exemplary embodiment according to the present invention.

Then e = 0 ;
Else
    Do nothing;

The factor UpBoundFactor can be optimized for different scenarios. An improved embodiment of the dual-filter block in FIG. 4 is presented in FIG. 10 with a module to upper-bound the error signal. Thus, FIG. 10 shows an exemplary placement of an upper bounding unit within a dual filter block arrangement. The incoming signal $e_{t,n_d}$ is fed to the upper bounding unit 1010 which applies the limitation as shown above. The output signal of the upper bounding unit 1010 is then fed to the filters 1030 and 1040 as previously explained with respect to FIG. 4.

Advanced modulation schemes, such as EDGE (Enhanced Data Rates for Global Evolution) provide for high speed data transmission, for example, in a GSM network system. However, in particular EDGE, for example, rotates the symbols by $$\frac{3\pi}{8}.$$

Figure 11:
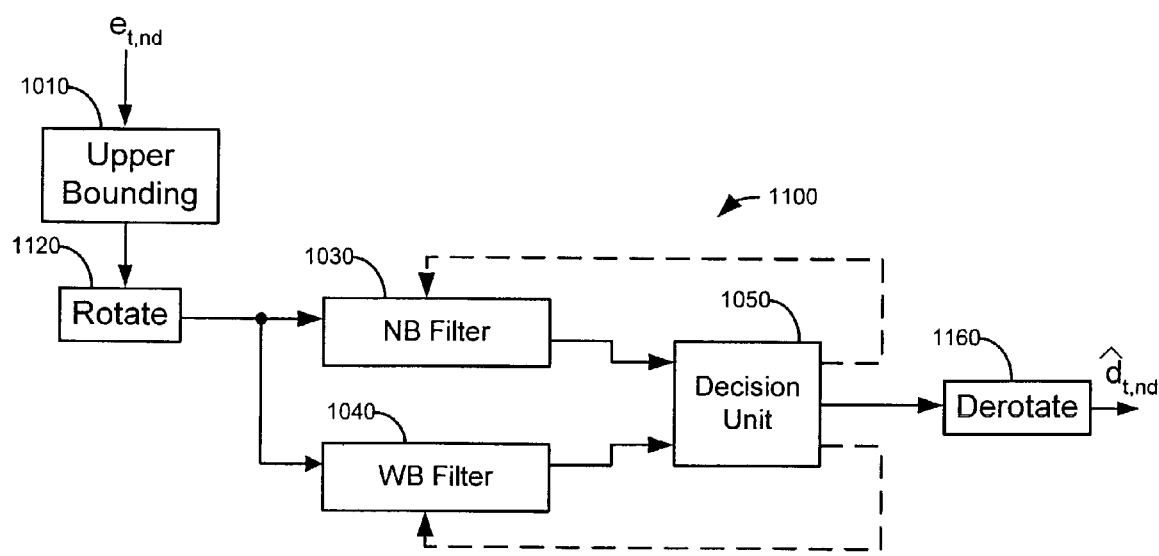
FIG. 11 shows a block diagram of yet another exemplary embodiment according to the present invention.

Thus, no reliable determination of the DC value is possible. Therefore, before the error signal is fed to the respective filter units, a reverse rotation is necessary. To this end, FIG. 11 shows another exemplary embodiment of yet another dual filter block arrangement. Similar elements have similar numerals with respect to FIG. 10.

Again, the incoming signal $e_{t,n_d}$ is fed to the upper bounding unit 1010 which applies the limitation as shown above. The upper-bounded signal is then fed to a rotation unit 1120. The output of the rotation unit 1120 is then fed to the first and second filters 1030, 1040. A decision unit 1050 is provided which receives the output signal of both filters 1030 and 1040, respectively. Again, decision unit may generate feedback signals (dotted lines) which are fed back to the filters. The output signal generated by decision unit 1050 is fed to a de-rotation unit 1160 which generates the output signal $d_{t,n_d}$.

Both arrangements as shown in FIGS. 10 and 11 avoid the DC tracking signal reaching unreasonable large values. Moreover, for EDGE receiver with rotated 8-PSK constellation, as shown in FIG. 11, the error signal can be re-rotated to compensate the rotation applied to the signal before channel estimation. Then the DC estimate at the output of the decision unit has to be appropriately de-rotated again before it is subtracted from $r_{t+1}$.

What is claimed is:

1. A DC tracking arrangement comprising:
   means for a first DC tracking unit, for slow DC tracking receiving an input signal and generating a first output signal;
   means for a second DC tracking unit, for fast DC tracking receiving the input signal and generating a second output signal; and
   means for a decision unit receiving the first and second output signal for selecting the first or second output signal.

2. The arrangement as in claim 1, wherein the first DC tracking unit is a narrow band filter and the second DC tracking unit is a wide band filter.

3. The arrangement as in claim 2, wherein the decision unit compares the absolute difference of the first and second filter output with a predefined threshold.

4. The arrangement as in claim 3, wherein each filter comprises a feedback input receiving a feedback signal from said decision unit.

5. The arrangement as in claim 3, wherein the threshold is the root-mean-square of the input signal times a constant.

6. The arrangement according to claim 1, further comprising means for an upper bounding unit for limiting the input signal.

7. The arrangement according to claim 6, wherein the upper bounding unit resets the input signal if the input signal is greater than a predetermined value.

8. The arrangement according to claim 1, further comprising means for a rotation unit for rotating the input signal wherein the rotation unit receives the input signal and is coupled with the first and second filter and means for a de-rotation unit coupled to the output of the decision unit.

9. A Viterbi equalizer comprising a plurality of states, wherein each state comprises a DC tracking arrangement comprising:
   means for a first DC tracking unit for slow DC tracking receiving an input signal and generating a fast output signal;
   means for a second DC tracking unit for fast DC tracking receiving the input signal and generating a second output signal; and
   means for a decision unit receiving the first and second output signal for selecting the first or second output signal.

10. The Viterbi equalizer as in claim 9, wherein the first DC tracking unit is a narrow band filter and the second DC tracking unit is a wide band filter.

11. The Viterbi equalizer as in claim 9, wherein the decision unit compares the absolute difference of the first and second filter output with a predefined threshold.

12. The Viterbi equalizer as in claim 11, wherein each filter comprises a feedback input receiving a feedback signal from said decision unit.

13. The Viterbi equalizer as in claim 10, wherein the threshold is the root-mean-square of the input signal times a constant.

14. The Viterbi equalizer as in claim 9, further comprising means for an upper bounding unit for limiting the input signal.

15. The Viterbi equalizer as in claim 14, wherein the upper bounding unit resets the input signal if the input signal is greater than a predetermined value.

16. The Viterbi equalizer as in claim 9, further comprising means for a rotation unit for rotating the input signal wherein the rotation unit receives the input signal and is coupled with the first and second filter and means for a de-rotation unit coupled to the output of the decision unit.

17. The Viterbi equalizer as in claim 9, wherein each state receives a plurality of DC offset values and a input symbol further comprising:
   means for a plurality of subtractors for subtracting one of the plurality of DC offset values from the input symbol and generating an output signal;
   means for a plurality of metric calculation units each receiving a respective output signal from an associated subtractor for providing a metric output signal;
   means for a compare unit receiving the plurality of metric output signals for generating an error signal which is used as the input signal for the DC tracking arrangement.

18. Computer readable medium encoded with computer executable instructions for determining and tracking a DC offset in a digital signal stream used for symbol detection, said instructions when executed:
   providing a digital signal stream to an equalizer for symbol determination; determining an error value for each symbol;
   narrow band filtering the error value for slow tracking of the DC offset; wide band filtering the error value for fast tracking of the DC offset;
   comparing the output values of the narrow and wide band filtering and selecting the narrow or wide band output values as a DC offset value.

19. The method as in claim 18, wherein the narrow band filtering is a low pass filtering and the wide band filtering is a high pass filtering.

20. The method as in claim 18, wherein the step of comparing comprises: comparing the absolute difference of the output values of the narrow band and the wide band filtering with a predefined threshold.

21. The method as in claim 20, wherein the threshold is based upon the root-mean-square value of the digital signal stream.

22. The method as in claim 18, further comprising the step of upper-bounding the input signal.

23. The method as in claim 22, wherein the step of upper-bounding includes the step of comparing the input signal with a predetermined value and resetting the input signal if the input signal is greater than the predetermined value.

24. The method as in claim 18, further comprising the step of rotating the input signal before determination of the DC offset and de-rotating the signal after determination of the DC offset.

* * * * *